Jan. 23, 1968     T. F. CALLAHAN     3,364,776
GEAR TOOTH LUBRICATION SYSTEM
Filed Aug. 26, 1965
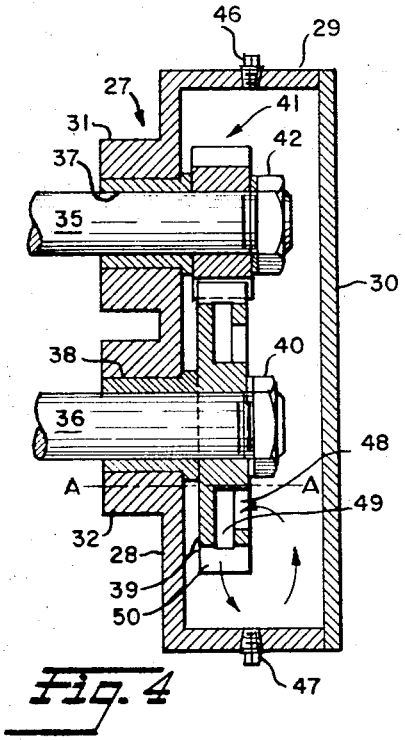
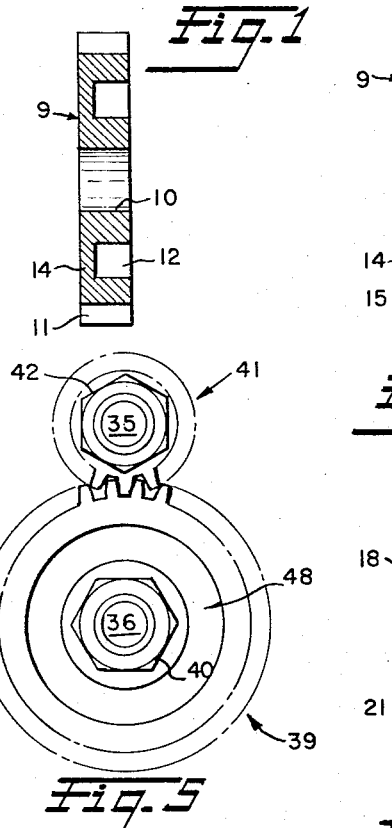
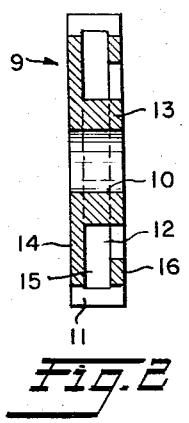
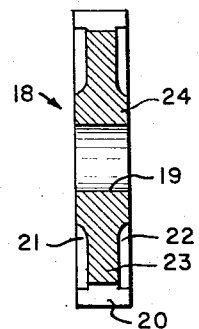
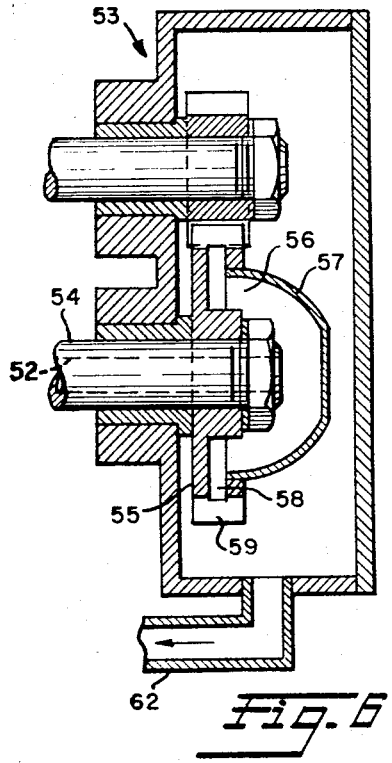
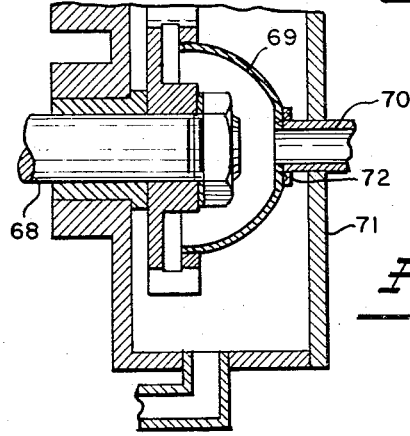
INVENTOR
THEODORE F. CALLAHAN
BY *Strauch, Nolan, Neale, Nies & Bronaugh*
ATTORNEYS

United States Patent Office 3,364,776
Patented Jan. 23, 1968

3,364,776
GEAR TOOTH LUBRICATION SYSTEM
Theodore F. Callahan, Box 112A,
Iron River, Wis. 54847
Filed Aug. 26, 1965, Ser. No. 482,843
7 Claims. (Cl. 74—467)

ABSTRACT OF THE DISCLOSURE

A system for improving the lubrication of the contacting surfaces of gear teeth, and more specifically to the provision of gears which by their construction provide a centrifugal pumping action to the lubricating oil to deliver it directly to the meshing gear teeth.

The supplying of sufficient lubricant to the teeth of meshing gears has always been a problem, especially when the gears are running at high speed, because most of the oil which may have been applied to the gears, as by an oil bath or the like, is thrown off by centrifugal force before the meshing gear is engaged. In some cases only an emulsion of lubricant and air or gas remain on the teeth by the time the meshing gear is reached by the gear teeth farthest from the oil bath.

In accordance with my invention at least one of the gears of a set is so constructed so as to deliver oil by centrifugal force directly to the roots of the gear teeth, from which it is further delivered by the same centrifugal force to the engaging faces of the drive and driven gears. The flow of oil is continuous, being supplied by a continuous pressure source or from an oil bath wherein one of the gears is partially immersed.

It is accordingly the principal object of my invention to provide a new and improved system for lubricating gear teeth.

Another important object of the invention is the provision of novel gears which are adapted to be driven at high speed and which deliver lubricant under the influence of centrifugal force to the working engaging faces of the teeth of a gear set.

Still another important object of the invention is the provision of a novel system for circulating oil continuously from a source under pressure into the space between the working faces of the teeth of a gear set.

Other objects will become apparent as the description proceeds in connection with the accompanying drawings, wherein:

FIGURE 1 is a vertical sectional view through a partially completed gear of one embodiment of my invention.

FIGURE 2 is a vertical sectional view of a completed gear in accordance with one embodiment of my invention.

FIGURE 3 is a vertical sectional view of a completed gear in accordance with another embodiment of my invention.

FIGURE 4 is a vertical section through a housing containing a driving and a driven gear in accordance with an embodiment of my invention.

FIGURE 5 is a side elevation as viewed from the right of FIGURE 4 but with the housing omitted.

FIGURE 6 is a vertical section through a housing containing a driving and a driven gear in which the oil is circulated into and out of the housing.

FIGURE 7 is a partial sectional view similar to that of FIGURE 6 but of a system wherein the oil is admitted in a different manner.

Referring to FIGURE 1, which is a partly completed gear in accordance with one embodiment of my invention, there is shown a conventional spur gear 9 having a central bore 10 and peripheral teeth 11. The body of the gear, which is otherwise of the same thickness from the bore to the outer ends of the teeth, has an annular recess 12 concentric with the bore 10 and slightly spaced therefrom, thus forming a web 14 on one side of the gear and a hub 13 between the recess and the bore.

The completed gear is shown in FIGURE 2. As shown, the outer peripheral wall of the recess 12 has been cut away to a point slightly beyond the roots of the teeth 11 to form a peripheral recess 15 so that the recess 12 is in communication with the space between each adjoining pair of teeth. The recess 15 is not as wide as the recess 12, there remaining an annular web 16 on the opposite face of the gear from the web 14. Thus, the recess 15 is essentially a U-shaped annular trough with its open end facing the axis of the gear and its closed end having an endless series of openings therethrough, each opening communicating with a space between a pair of adjoining gear teeth. As will become apparent from the following description of the lubrication system, the communication between the recess 12 and the spaces between adjoining gear teeth could be provided in other ways, such as by radial holes drilled through the roots of the teeth 11 and to the annular recess 12.

FIGURE 3 illustrates another embodiment of a gear embodying my invention. In this case a gear 18 has a central bore 19 and peripheral teeth 20. The body of the gear has similar annular recesses 21 and 22 on its opposite sides, concentric with the bore 19. Each recess 21 and 22 extends from a hub 24 around the bore 19 to a point slightly beyond the roots of the teeth 20, there being a central web 23 between the recesses. Thus, each recess is in communication with the space between each pair of adjoining teeth 20 on the periphery of the gear.

FIGURE 4 shows a gear train and housing therefore, providing a lubrication system employing a gear shown in the embodiment of FIGURE 2. A housing 27 includes an end wall 28, a peripheral wall 29 and a removable closure wall 30 secured to the peripheral wall as by screws or the like, not shown. The end wall 28 has two hollow cylindrical bosses 31 and 32 and rotary shafts 35 and 36 are mounted within anti-friction means such as bearing bushings 37 and 38 within the bosses. Conventional oil seals, not shown, are provided to prevent the loss of lubricant where the shafts pass through the bosses 31 and 32.

A spur gear 39 of the type shown in FIGURE 2 is affixed to the end of the shaft 36 within the housing as by a key and a threaded nut 40, and a mating spur gear 41 is similarly fixed to the end of the shaft 35 as by a key and a threaded nut 42. Either gear may drive the other. An oil filler hole in the top of wall 29 is closed by a plug 46 and a drain hole in the bottom is closed by a plug 47.

Sufficient lubricating oil is admitted through the oil filler hole so that the oil level in the housing is substantially at the level indicated by the line A—A of FIGURE 4 when the gears are running at normal speed. This will assure that the entire recess 48 in the gear, in its lower portion, is completely immersed in oil. The oil level may be at a higher level than that indicated at A—A, as will be understood.

With the gears rotating at their normal speed the teeth 50 on gear 39 act as vanes of a centrifugal pump, throwing the oil in the recess 48 and the U-shaped recess 49 radially outwardly and over the working faces of the gear teeth, so that they will be covered with oil when they engage the teeth of the mating gear 41. The openings connecting the roots between adjoining teeth with the peripheral U-shaped recess 49 are preferably so calibrated that there is still some oil in the recess 49, and flowing outwardly through the openings under centrifugal force at the time that the teeth 50 are engaging the teeth on gear 41.

Within the oil bath below the level A—A in the housing, besides the agitation caused by the rotation of gear 39 in the bath, there will be a counter-clockwise swirling indicated by the arrows, because of the flow of the oil outwardly between the teeth under the influence of centrifugal force. Thus, within the bath, the oil will be flowing outwardly between the teeth, then upwardly and finally into the annular recess 48.

The embodiment of the gear shown in FIGURE 3 is also adapted for use in the oil bath system of FIGURE 4. When so used, oil will be thrown radially outwardly along both sides of the central web 23 between the recesses 21 and 22, and thence between the faces of adjoining gear teeth. Within the bath there will be a circulation counter-clockwise as in FIGURE 4 and also a circulation clockwise on the other side of the central web 23.

FIGURES 6 and 7 show a system using a housing 53 similar to that of FIGURE 4 except that oil filler and drain holes need not be provided. In the case of FIGURE 6 of the lower shaft 54 is hollow, and oil is admitted therethrough. The lower gear 55 is similar to those of FIGURES 2 and 4, but the annular recess 56 is covered by a cup shaped closure 57 having a tight fit within the outer periphery of the recess. Oil issuing from the hollow shaft 54 is delivered directly to the recess 56 and then to the U-shaped recess 58 from which it flows outwardly between adjoining gear teeth 59. Since the cup shaped enclosure 57 is rotating with the gear the lubricating oil will be distributed substantially evenly throughout the circumference of the annular recess 56 and to the gear teeth under the influence of centrifugal force. The oil which has been discharged from between the gear teeth will collect in the bottom of the housing, from which it is continuously drained by a conduit 62. Before returning through the hollow shaft 54 the oil may be directed to cleaning, cooling, or control devices and may be used for the lubrication of other devices. Normally the centrifugal pump action of the gear 55 is sufficient to keep the oil circulating through the system.

In the system of FIGURE 7 the difference from that of FIGURE 6 is that the lower shaft 68 is not hollow. Oil is supplied to the cup shaped closure 69 by a fixed inlet pipe 70 which passes through the removable housing closure wall 71 and into the central portion of the closure 69. A conventional oil seal 72 prevents oil leakage between the fixed pipe 70 and the rotating closure 69. In other respects the system is similar to that of FIGURE 6.

Thus, each of the embodiments provides means for the continuous circulation of lubricating oil over the faces of adjoining gear teeth under the influence of centrifugal force. There is a resulting reduction of wear of the gears and power loss due to friction and heat. While the invention is illustrated in connection with spur gears it is equally applicable to gears of other types.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a lubrication system for gears, a gear having peripheral teeth, a central hub and an annular recess between said hub and said teeth, including angularly spaced areas extending beyond the roots of adjacent pairs of teeth and between the opposing faces of respective pairs of said teeth so as to form centrifugal pump passages flooding the meshing gear teeth with lubricating oil continuously introduced into said recess.

2. In the lubrication system described in claim 1 there being similar annular recesses on the opposite faces of the gear, the teeth of the gear being connected to the hub by a central web between said recesses.

3. A lubrication system for gears, comprising:
(a) a housing,
(b) a gear train in said housing including at least one gear having peripheral teeth and a central hub,
(c) an annular recess in the side of said one gear between said hub and said teeth, and radially extending passageways between said annular recess and the roots of said teeth,
(d) means for continuously supplying lubricating oil to said annular recess,
(e) said last mentioned means including a closure for said annular recess, and means for suplying lubricating oil to the interior of said closure.

4. In the lubrication system described in claim 3, said last mentioned means including means for continuously removing lubricating oil from said housing and returning it to said annular recess.

5. In a lubrication system for gears:
(a) a housing,
(b) a gear train in said housing, including a first gear in said train located in the lower part of said housing and rotatable about a horizontal axis,
(c) said first gear having peripheral teeth and a central hub,
(d) an annular recess in the side of said first gear between said hub and said teeth, and radially extending passageways between said annular recess and the roots of said teeth,
(e) and means for maintaining a level of lubricating oil in said housing at least above the lower portion of said recess in said first gear,
(f) said gear train including a second gear above the level of lubricating oil and in engagement with said first gear.

6. In the lubrication system described in claim 5, there being similar annular recesses on the opposite faces of said first gear, the teeth of the gear being connected to the hub by a central web between said recesses.

7. A lubrication system for gears, comprising:
(a) a housing,
(b) a gear train in said housing including at least one gear having peripheral teeth and a central hub,
(c) an annular recess in the side of said one gear between said hub and said teeth, and radially extending passageways between said annular recess and the roots of said teeth,
(d) and means for continuously supplying lubricating oil to said annular recess,
(e) said last mentioned means including a closure for said annular recess, and
(f) the shaft on which said gear is mounted being hollow for the delivery of lubricating oil to the interior of said closure.

References Cited

UNITED STATES PATENTS

| 807,731 | 12/1905 | Dodge | 74—230 |
| 1,186,434 | 6/1916 | Pierce | 74—468 X |
| 2,734,607 | 2/1956 | Hindmarch | 74—468 X |

FOREIGN PATENTS

| 301,477 | 10/1917 | Germany. |
| 270,876 | 5/1927 | Great Britain. |

DONLEY J. STOCKING, *Primary Examiner.*

L. H. GERIN, *Assistant Examiner.*